Feb. 12, 1957 W. R. BYRD 2,781,069
JUICER AND MEASURING CUP COMBINATION
Filed Oct. 12, 1953 2 Sheets-Sheet 2

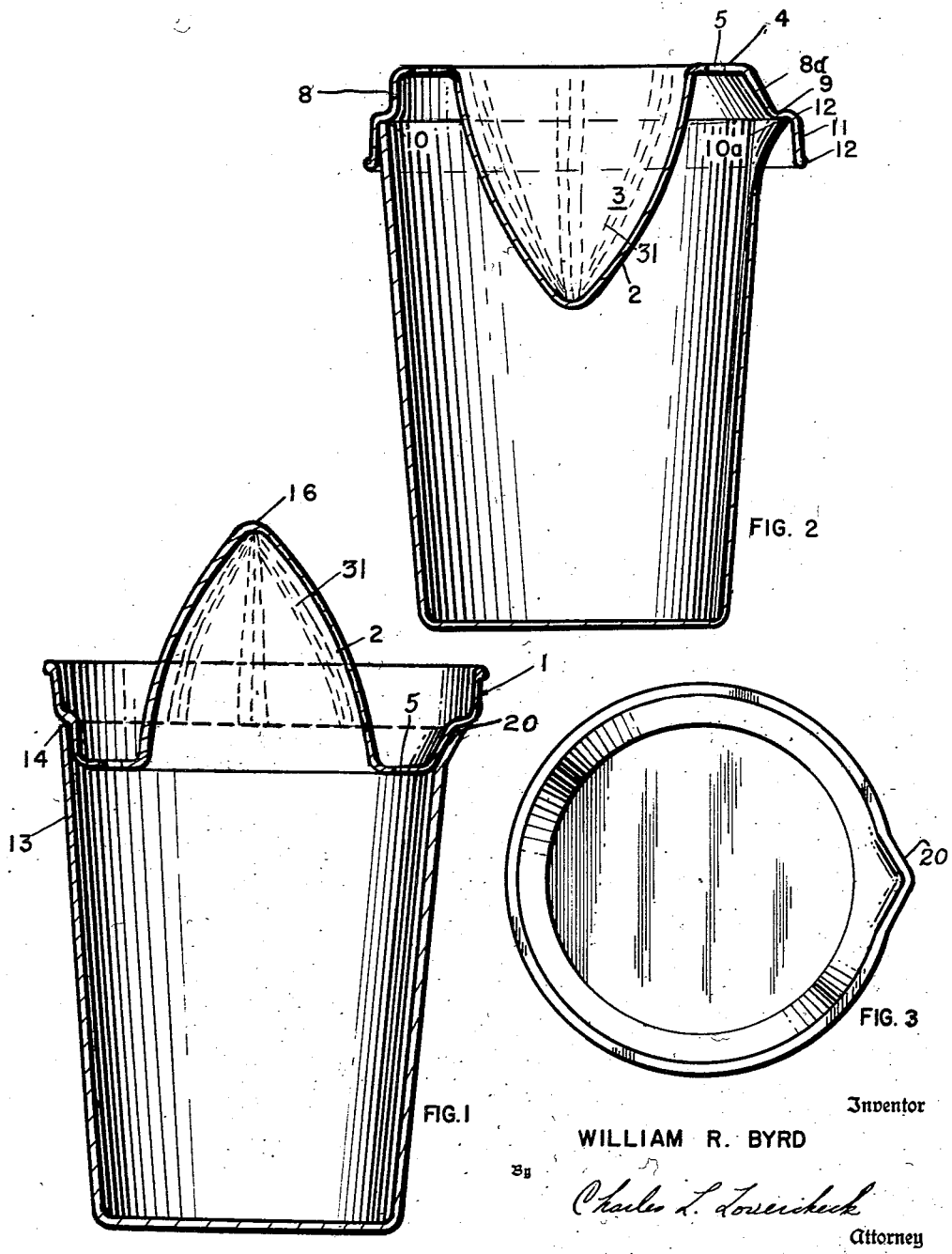

Inventor
WILLIAM R. BYRD
Attorney

United States Patent Office 2,781,069
Patented Feb. 12, 1957

2,781,069
JUICER AND MEASURING CUP COMBINATION
William R. Byrd, Erie, Pa.

Application October 12, 1953, Serial No. 385,323

1 Claim. (Cl. 146—3)

This invention relates to juicers and more particularly to devices for removing and collecting juice from oranges, lemons, and similar fruits.

Juicers made according to previous designs, and with which I am familiar, had no provision made to enable the juicer to fit snugly on the top of a glass, cup, or similar container whereby the juicer would not rotate relative to the container when a tortional motion was applied to the juicer itself. Furthermore, juicers with which I am familiar were not previously made so that they could be used in an inverted position to cover cups, glasses, and similar containers.

It is, accordingly, an object of my invention to overcome the above and other defects in prior juicers and more particularly it is an object to provide a juicer which is simple in construction, efficient in operation, and economical to manufacture.

Another object of my invention is to provide a juicer which will be held against rotation on the top of a cup or glass.

Another object of my invention is to provide a novel type of slot in a juicer for draining the juice out of a juicer.

Another object of my invention is to provide a measuring cup in combination with a juicer wherein the juicer is fitted into and telescopic with the top of the measuring cup.

A further object of my invention is to provide a juicer having a pouring spout which nests into the pouring spout of a measuring cup to prevent the measuring cup from rotating relative to the juicer.

Another object of the invention is to provide a juicer having a downwardly extending portion to interfit with a top of a container and an outwardly extending shoulder to rest on the edge of the container.

With the above and other objects in view, the present invention consists of the combination and arrangement of parts hereinafter more fully described, illustrated in the accompanying drawings, and more particularly pointed out in the appended claim, it being understood that changes may be made in the form, size, proportions, and minor details of construction without departing from the spirit or sacrificing any of the advantages of the invention.

In the drawings:

Fig. 1 is a cross sectional view of a juicer according to my invention installed in a measuring cup;

Fig. 2 is a cross sectional view similar to Fig. 1 showing the juicer in an inverted position on the measuring cup;

Fig. 3 is a top view of a measuring cup for use with my novel juicer;

Figure 4:
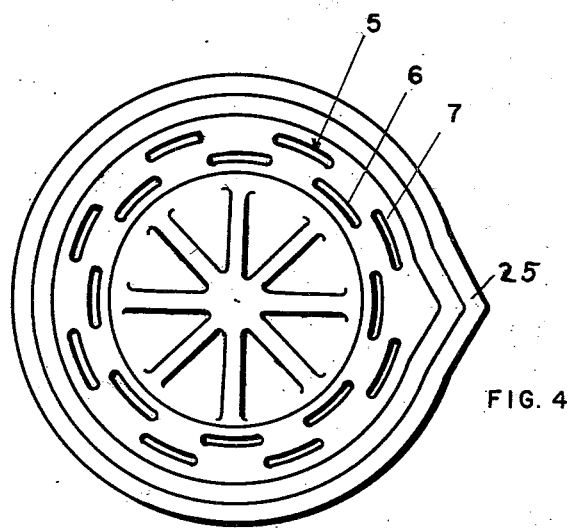
Fig. 4 is a top view of my juicer.
Figure 5:
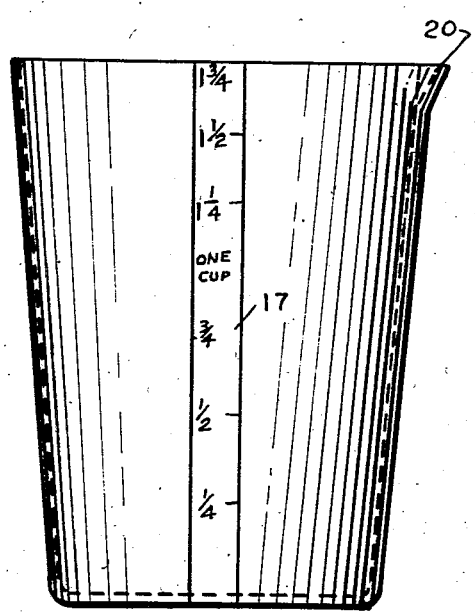
Fig. 5 is a side view of a measuring cup for use with my juicer.

Referring now to the drawings, the juicer 1 has the convex fruit engaging portion 2 which has ridges 31 thereon for squeezing the juice from the pits of a lemon, orange, or similar fruit. The arched portion 2 is convex at the underside 3 thereof and extends radially outward to connect with the laterally extending portion 4. The laterally extending portion 4 is concentric with the arched portion 2 and has the elongated arcuate shaped circumferentially disposed slots 5 disposed in spaced rows 6 and 7 around the periphery of the arched portion 2.

The outer edge of the laterally extending portion 4 is secured to the outward and axially extending portion 8. The juicer 1 then extends outward to form a ledge at 9 to form a measuring cup or container engaging surface 10 and then downwardly axially at 11 to form a flange for engaging the edge of a container and terminating in the edged portion 12. It will be noted that the surface 10 of the outwardly extending portion 9 is adapted to rest on the upper edge of the measuring cup 13 at 14 when the juicer 1 is in the position shown in Fig. 1; that is, ready for use. When the juicer 1 is inverted on top of the measuring cup 13 as shown in Fig. 2, the surface 10 will rest on the upper edge of the cup 13 and the axially extending portion 8 telescopically extends thereinto, thereby forming a cover for the cup 13.

The juicer 1 has a lip portion 25 which forms a spout which is formed by extending the axially extending portion 8 outwardly at 8a to fit into the spout 20 of the measuring cup 13. The laterally extending portion 9 is likewise extended outwardly at 12 so that the surface 10a will rest on top of the spout 20 of the measuring cup 13.

During operation, the housewife or other person using the device will rest it on top of the measuring cup 13 as shown in Fig. 1 and press the inverted half of a lemon, orange, or other fruit over the point 16 of the member 2. The ridges 31 will squeeze the juice from the fruit and the juice will run down into the channel between arched portion 2 and axially extending walls 8 through the slots 5 into the measuring cup 13. The measuring cup 13 may be calibrated as at 17 to indicate to the user the quantity of juice that has been extracted. If it is desired to store the juice in the cup, the juicer 1 can be inverted as shown in Fig. 2 and the juice will be protected and kept fresh by the juicer which forms a cover as shown.

The measuring cup with the juicer cover is also suitable as a packaging container for products such as cottage cheese wherein the juicer and cup constitute a premium to the purchaser and form a suitable container for the promotional sales use of packing ice cream, cottage cheese, or any household soft items usually packed in bulk.

In the foregoing specification, I have set forth the invention in its preferred practical forms but I am aware that the structure shown is capable of modification within a range of equivalents without departing from the invention which is to be understood is broadly novel as is commensurate with the appended claim.

The embodiments of the invention in which an exclusive property or privilege is claimed are defined as follows:

In combination, a juicer and a round container comprising an open topped container having a spout, a juicer supported on said container having a fruit engaging member with ridges thereon, said fruit engaging member terminating at the lower end in a radially outwardly extending portion to form a laterally extending portion, then extending generally axially and then outwardly to form a container engaging portion to engage the rim of said container and to support said juicer on said container, said axially extending portion extending into said container, and circumferentially spaced arcuate slots disposed through said radially extending portion to conduct fruit juice from one side of said juicer into said container, one side of said container bent outwardly to form said spout on one side of said rim, said axially extending portion of said juicer being bent outwardly to form a lip on said juicer interfitting with said container spout whereby relative rotation of said juicer is resisted, said juicer then extending axially to form a flange to telescopically engage said container and to support said juicer on top of said container in an inverted position with said lip on said juicer overlying said container spout, thereby forming a cover therefor.

References Cited in the file of this patent

UNITED STATES PATENTS

| | | |
|---|---|---|
| D. 27,948 | Blake | Dec. 7, 1897 |
| 1,141,834 | Schatterman | June 1, 1915 |
| 1,674,475 | Loomis | June 19, 1928 |
| 1,748,483 | Hyde | Feb. 25, 1930 |
| 2,500,611 | Kereluck | Mar. 14, 1950 |